US012287704B1

(12) United States Patent
C et al.

(10) Patent No.: US 12,287,704 B1
(45) Date of Patent: Apr. 29, 2025

(54) VIRTUAL PRE-SOLUTION MANIFESTER

(71) Applicant: Bank of America Corporation, Charlotte, NC (US)

(72) Inventors: Nithya C, Chennai (IN); Meenakshi MeenakshiSundaram, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 10 days.

(21) Appl. No.: 18/404,099

(22) Filed: Jan. 4, 2024

(51) Int. Cl.
   *G06F 11/00* (2006.01)
   *G06F 11/07* (2006.01)
(52) U.S. Cl.
   CPC ...... *G06F 11/0793* (2013.01); *G06F 11/0778* (2013.01)
(58) Field of Classification Search
   CPC .......................... G06F 11/0793; G06F 11/0778
   See application file for complete search history.

(56) References Cited

U.S. PATENT DOCUMENTS

| | | | |
|---|---|---|---|
| 7,694,169 B2 | 4/2010 | Slater et al. | |
| 10,397,230 B2 | 8/2019 | Callaghan et al. | |
| 10,528,740 B2 | 1/2020 | Callaghan et al. | |
| 12,056,006 B1* | 8/2024 | Bishop | G06F 11/0793 |
| 2024/0036965 A1* | 2/2024 | Habel | G06F 11/3034 |

OTHER PUBLICATIONS

"YAML Reference: Azure Container Instances," https://learn.microsoft.com/en-us/azure/container-instances/container-instances-reference-yaml, Jul. 25, 2022.
"How to Define a Digital Twin, Digital Triplet and Reality Twin?" Inqiludio Digital, May 12, 2022.
Arungalai Anbarasu, "From Digital Twins to Digital Triplets: Detecting Defects Today to Prevent Them Tomorrow," Forbes, Sep. 7, 2022.

* cited by examiner

*Primary Examiner* — Jason B Bryan
(74) *Attorney, Agent, or Firm* — Weiss & Arons LLP

(57) ABSTRACT

Systems and methods for using digital triplets to generate a bundle of remediation scripts for healing a system failure is provided. The systems may include a stand-alone embedded internet of things edge artificial intelligence computing device ("EIEAC") coupled to a computing device and a remote emulator. The EIEAC may send to the remote emulator a file including configuration details of the computing device at a time of a failure of the computing device and computer health data. The remote emulator may feed the file to a machine learning algorithm to generate remedial scripts for healing the system failure. The remote emulator may create a plurality of digital triplets to test the remedial scripts.

20 Claims, 4 Drawing Sheets

VIRTUAL PRE-SOLUTION MANIFESTER

FIELD OF TECHNOLOGY

Aspects of the disclosure relate to remediating and repairing errors on computing devices leveraging an external IoT device.

BACKGROUND OF THE DISCLOSURE

Remote computer technical support over the internet is commonly used due to ease of access and affordability. When a computing device is experiencing technical difficulties, the remote support may access the computing device through the internet connection and attempt to resolve the issues. Such remote support, however, relies on an established internet connection between the computing device and the remote support website. In the event that the computer is unable to support an internet connection, access to technical support is lost.

It would be desirable, therefore, to leverage an external device that operates independent of the computing device to provide seamless technical support for the computing device that is not dependent on the computing device's internet connection.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
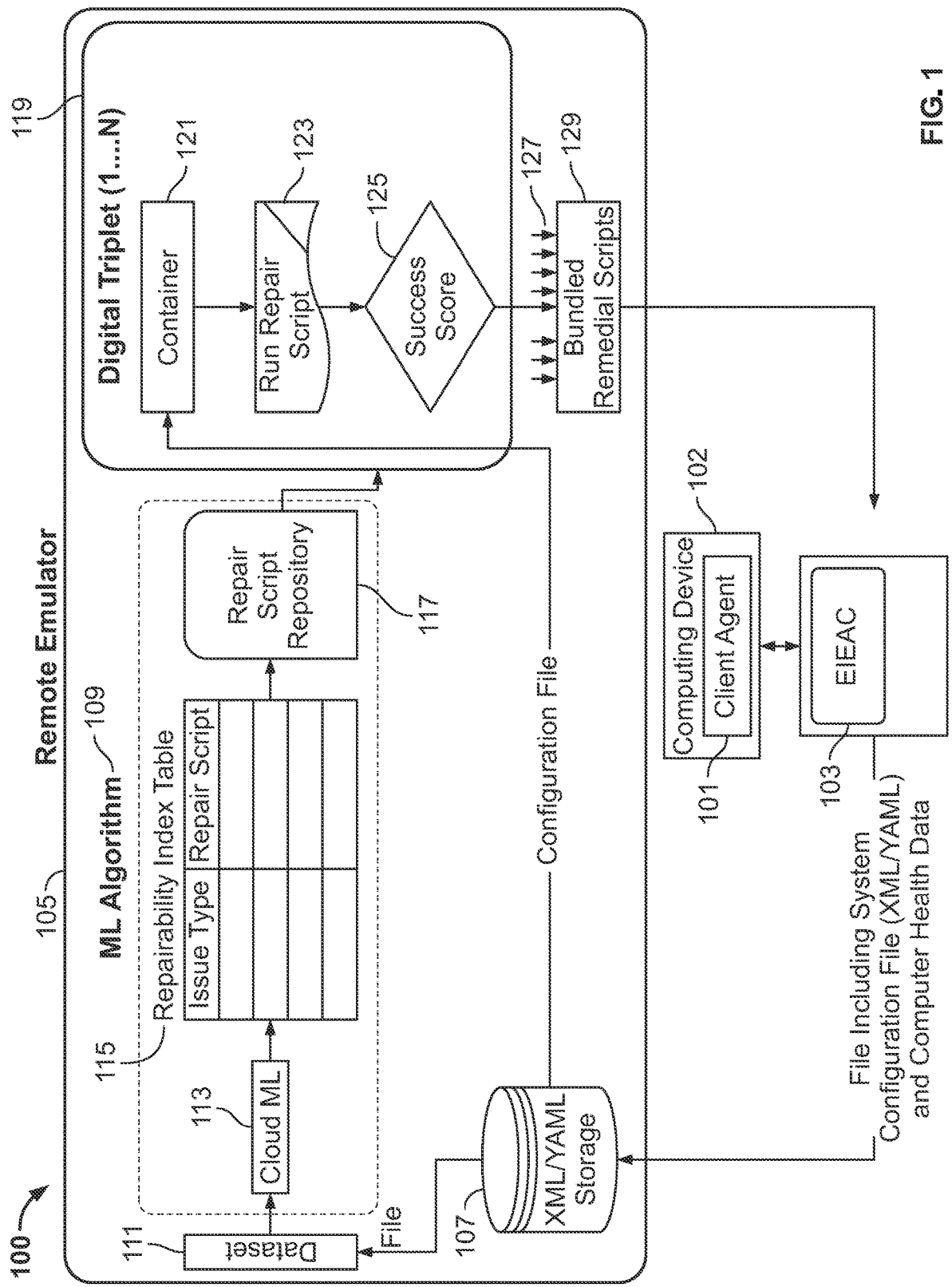
FIG. 1 shows an illustrative architecture diagram in accordance with principles of the disclosure.

Systems and methods for using digital triplets to generate a bundle of optimal remediation scripts for healing a system failure are provided. The systems and methods may include a stand-alone embedded internet of things edge artificial intelligence device ("EIEAC"). The EIEAC may be configured to operate independent of the computing device. The EIEAC, when physically coupled to a computing device, may be configured to monitor and repair failures occurring at the computing device. The systems and methods may include a remote emulator. The remote emulator may be in wireless electronic communication with the EIEAC. The remote emulator may be a cloud-based platform for using artificial intelligence, machine learning and/or digital triplets to generate one or more remedial scripts for fixing a system failure of the computing device.

The computing device may be a laptop. The computing device may be a desktop computer. The computing device may be a computing device from a plurality of computing devices. The computing device may also include a point-of-sale device. The computing device may be a smartphone.

The EIEAC may be physically coupled to the computing device. The EIEAC may be a peripheral of the computing device. The EIEAC may be physically coupled to the computing device via one of a universal serial bus ("USB") port, serial port, parallel port, specialized network card, and/or ethernet network.

The EIEAC may be a 5G enabled internet of things ("IoT") device. The EIEAC may leverage a successor to 5G cellular technology. The EIEAC may include battery power, internet connectivity and essential booting files.

The EIEAC may be enabled to communicate with the computing device using the address of the EIEAC. The processor of the computing device may place the device address on an address line. Each interface of the computing device may decode the address and a control received from any one of the I/O busses and interpret them as a peripheral and further send signals.

The computing device may be a computing device selected from a plurality of computing devices. The computing device may be a part of a network of computing devices. Each computing device may be coupled to an EIEAC. Each EIEAC may be in electronic communication with the remote emulator. In some embodiments, each EIBAC may be in electronic communication with the remaining, unselected, EIEACs.

The EIEAC may include a receiver. The receiver may be configured to receive computer health data from a client agent application running on the computing device. The client agent application may be an application that crawls the computing device and monitors the health of the computer. The client agent application may gather computer health data and transmit it to the EIEAC for identifying errors and failures.

In some embodiments, the computer health data may include data that does not signify any issues associated with errors, failures and/or onset of a failure. The computer health data may be stored at the EIEAC and, in some embodiments, further transmitted to the remote emulator for enhancing artificial intelligence ("AI") and machine learning ("ML") of the remote emulator.

Exemplary computer health data may include one or more of data associated with one or more of a registry backup, event logs, disorganized files, memory, heating of a central processing unit ("CPU") and a graphical processing unit ("GPU"), operating system ("OS") functionality, a blue screen of death ("BSOD") error, basic input/output system ("BIOS") settings and restore points.

The EIEAC may also include a memory configured to store the computer health data. The memory may be a solid-state drive ("SSD"). An SSD, or solid-state drive, may be a type of storage device used in computers. The SSD may be a non-volatile storage media that may store persistent data on solid-state flash memory. With an SSD, the computing device's operating system may boot up more rapidly, programs may load quicker and files may be saved faster.

The EIEAC may further include a battery. The battery may be configured to charge the EIEAC. When the computing device has power, the battery may draw power from the computing device to charge. The EIEAC may be configured to operate when power at the computing device may not be provided. When the computing device loses power, the EIEAC may be configured to maintain power at the EIEAC. When the computing device loses power, the EIEAC may be configured to supply power temporarily to the computing device.

The EIEAC may be configured to operate independent of the computing device. The EIEAC may be enabled to operate independent of the computing device because the EIEAC is an IoT device with its own power, data storage, processor and internet connectivity.

The EIEAC may also include a processor. The processor may be configured to process the computer health data received from the client agent application. The processing may identify one or more system failures. The processing may use tiny machine learning ("tinyML") for identifying the one or more system failures. In some embodiments, the processing may identify an onset of a failure prior to the failure occurring. Exemplary failures may include a file stopping to run, a blue screen of death, a failure of a document to upload to the internet, identifying a virus, or any other failure in the functioning of the computing device.

When a system failure is identified by the processor, the tinyML may send to the remote emulator a file including configuration details of the computing device at the time of the failure. The tinyML may also send to the remote emulator at least some of the computer health data. The file may be in XML or YAML format. The configuration details may be system configuration settings of the computing device. The configuration details may include hardware and software specifications of the computing device, such as a model of the computing device, a model of attached hardware, and software version numbers of software running on the computing device.

In some embodiments, the computer health data may be computer health data stored by the EIEAC within a first time period prior to the system failure. In some embodiments, at least some of the computer health data may be stored within a time frame immediately preceding the system failure. Exemplary first time periods may be 5 minutes, 10 minutes, 1 hour, 12 hours, one day, two days, or any other suitable time period. The first time period/time frame may be based on the identified failure. For example, if the system failure is a failure of a file to open, the time frame may be 10 minutes. If the system failure is categorized by the EIEAC as a more severe failure, such as a virus infiltration or a BSOD error, the time period may be a second time period that is substantially longer than the first time period, such as 12 hours or 24 hours.

When a system failure is identified by the processor, the tinyML may continuously transmit a stream of data to the remote emulator. The stream of data may include a graphics processing unit ("GPU") temperature and a central processing unit ("CPU") temperature. The GPU and the CPU may be included in the computing device. The stream of data may include real-time values of the GPU and CPU temperatures. The data may be continuously requested, and received, by the EIEAC from the computing device.

Upon receipt of the file, the remote emulator may feed the file to a machine learning algorithm. The remote emulator may receive, from the machine learning algorithm, remedial scripts. Each remedial script may be a different proposed approach, by the machine learning algorithm, for healing the system failure. The machine learning algorithm may be trained using training data identifying a plurality of system failures and, for each system failure, remedial scripts that were successful for fixing the system failure.

The remote emulator may create a plurality of digital triplets using the system configuration settings and the stream of data. The remote emulator may create a plurality of digital triplets using the file and the stream of data.

The digital triplets may act as a sand box to test the remedial scripts by replicating the system configuration settings and modeling the CPU and GPU temperature. The number of digital triplets may be equal to the number of remedial scripts output by the machine learning algorithm. Each of the digital triplets may be used by the remote emulator to test one of the remedial scripts.

Each of the digital triplets may be the same. Each of the digital triplets may replicate the computing system using the configuration details and the temperatures. Each of the digital triplets may use the stream of data to update their replication, in real time, to model the current temperature of the CPU and GPU. Thus, the digital triplets may reflect a current state of the temperature of the GPU and CPU of the computing device.

The remote emulator may run, in parallel, each of the remedial scripts on one of the digital triplets. During the running, the digital triplets may be continuously updated based on the stream of data. Running in parallel may allow the remote emulator to test each of the remedial scripts simultaneously, enabling the remote emulator to quickly output remedial scripts to the EIEAC.

The running of a remedial script on a digital triplet may be used to test the remedial script and, based on the success or failure of the running, output a success score. The success score may be a score from 0-1, 0-5, 0-100, or a score within any other suitable range. A highest success score may be assigned when a remedial script, when run in a digital triplet, completely fixes the system failure. Lower success scores may be assigned when a remedial script, when run in a digital triplet, partially fixes the failure or fixes the failure after repeated unsuccessful attempts, and/or fixes the system failure when the fix takes longer than a threshold time period. A lowest success score may be assigned when the remedial script does not fix the failure.

After the running of the remedial scripts for a predetermined time period, the remote emulator may terminate the digital triplets that have failed to output a success score. In some embodiments, at least some of the digital triplets may still be running after the lapse of the predetermined time period. The termination may include discontinuing the running of the remedial script and/or deleting the digital triplets that are still running—i.e., haven't yet output a success score.

In some embodiments, the remote emulator may collect from each of the remaining digital triplets a remedial script tagged with a success score. The remaining digital triplets may be the digital triplets that were not terminated by the remote emulator. In some embodiments, the remote emulator may collect from each of the remaining digital triplets a success score. The remote emulator may then tag a remedial script run by that particular digital triplet with the success score output by that digital triplet.

Thus, the remote emulator may collect from each digital triplet that was not terminated, a success score assigned to the remedial script by the digital triplet and, in some embodiments, the remedial script that was run by the digital triplet. The success score may be based on an actual success or failure of the remedial script to solve the system failure within the digital triplet. The success score may be based on a predicted success, by the digital triplet, of the remedial script to solve the system failure.

The remote emulator may bundle the remedial scripts tagged with a success score greater than a threshold value. The remote emulator may bundle a number of remedial scripts, such as 2, 5, 6, or 10, that were assigned the highest success scores from all the output success scores. The remote emulator may transmit the bundled remedial scripts to the EIEAC.

In some embodiments, the threshold value may be the same value for all system failures. In some embodiments, the threshold value may be a dynamic threshold value. The dynamic threshold value may be selected by the remote emulator based on the overall values of the collected success scores. The dynamic threshold value may be selected so that no more than a predetermined number of remedial scripts are to be included in the bundled scripts.

In some embodiments where all the computer health data is generated within a first predetermined time period, the predetermined time period during which the digital triplets are run may be a second predetermined time period.

In response to receipt of the bundled remedial scripts from the remote emulator, the EIEAC may search, on the computing device, a historical log file listing a plurality of previously-executed remedial scripts and a success or failure associated with each of the previously-executed remedial scripts. The EIEAC may search the bundled remedial scripts to determine if one or more remedial scripts in the bundle are identical to a previously-executed remedial script that is associated with a failure in the historical log file. The EIEAC may delete, from the bundled remedial scripts, each remedial script that is identical to a previously-executed remedial script stored in the historical log file and associated with a failure.

After the deleting, the EIEAC may transmit to the computing device a first remedial script included in bundled remedial scripts, the first remedial script being tagged with a highest success score in the bundled remedial scripts. The success score may be the highest success score relative to the remaining success scores in the bundle. In response to a determination that the first remedial script failed to remediate the system failure, the EIEAC may transmit to the computing device a second remedial script tagged with a second-to-highest success score in the bundled remedial scripts.

The file may be a first file. The bundled remedial scripts may be first bundled remedial scripts. The system failure may be a first system failure. The EIEAC may, based on the computer health data, predict an onset of a second system failure and transmit a second file to the remote emulator. In response to transmitting the second file, the EIEAC may receive, from the remote emulator, a second bundled remedial scripts for preventing the second system failure. The second file may have the data included in the first file. The second bundled remedial scripts may be generated by the remote emulator using the systems and methods described in connection with the first bundled remedial scripts.

The systems and methods of the invention may include methods for using digital triplets to generate a bundle of optimal remediation scripts for healing a system failure. The methods may have features in common with the system and system architecture described herein.

The methods may include the EIEAC processing the computer health data to identify one or more failures using tinyML. The methods may include, in response to an identification of a failure by the EIEAC, the EIEAC performing the method step of sending to a remote emulator a file including configuration details of the computing device at the time of the failure and at least some of the computer health data. The methods may also include the EIEAC performing the method step of continuously transmitting a stream of data to the remote emulator including GPU temperature and a CPU temperature, the GPU and the CPU being included in the computing device.

The methods may include the remote emulator performing the method steps of feeding the file to a machine learning algorithm and receiving, from the machine learning algorithm, remedial scripts. The methods may include the remote emulator performing the method step of creating a plurality of digital triplets using the file and the stream of data, each of the digital triplets for testing one of the remedial scripts.

The methods may include the remote emulator performing the method step of running, in parallel, each of the remedial scripts on one of the digital triplets. During the running, the digital triplets may continuously receive the stream of data.

The methods may include the remote emulator performing the method step of, after the running of the remedial scripts for a predetermined time period, terminating the running of the digital triplets that have failed to output a success score and collecting from each of the remaining digital triplets a remedial script tagged with a success score. The remedial script may have been run by the digital triplet.

The methods may include the remote emulator performing the method step of bundling remedial scripts tagged with a success score greater than a threshold value. The methods may include the remote emulator performing the method step of transmitting the bundled remedial scripts to the EIEAC.

The methods may include the EIEAC, in response to receipt of the bundled scripts from the remote emulator, perform the method step of searching, on the computing device, a historical log file listing a plurality of previously-executed remedial scripts and a success or failure associated with each of the previously-executed remedial scripts.

The methods may include the EIEAC performing the method step of deleting, from the bundled scripts, each remedial script that is identical to a previously-executed remedial script stored in the historical log file and associated with a failure. The methods may include the EIEAC performing the method step of, after the deleting, transmitting to the computing device a first remedial script included in bundled scripts. The first remedial script may be tagged with a highest success score in the bundled scripts.

The methods may include the EIEAC performing the method step of, in response to a determination that the first remedial script failed to remediate the system failure, transmitting to the computing device a second remedial script tagged with a second-to-highest success score in the bundled scripts.

Illustrative embodiments of apparatus and methods in accordance with the principles of the invention will now be described with reference to the accompanying drawings, which form a part hereof. It is to be understood that other embodiments may be utilized, and structural, functional and procedural modifications may be made without departing from the scope and spirit of the present invention.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

Apparatus and methods described herein are illustrative. Apparatus and methods of the invention may involve some or all of the features of the illustrative apparatus and/or some or all of the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

FIG. 1 shows illustrative system architecture 100 in accordance with principles of the disclosure. Computing device 102 may include an EIEAC 103 that may be physically coupled to computing device 102. EIEAC 103 may be coupled to computing device 102 via a one of a USB port, media card reader or any other suitable port.

EIEAC 103 may include hardware and software embedded in the EIEAC 103. The hardware and software may include a memory, bootable files, a battery, tinyML, 5G network capabilities, an RPA executor and a secure client communication tool. The battery may be configured charge EIEAC 103 independent of computing device 102.

EIEAC 103 may include 5G technology to enable a seamless internet provision that may enable a quicker transfer of health monitoring data and of edge AI to the remote emulator. The bootable files may be files that, upon execution, may be enabled to boot computing device 102 when the computing device fails to boot. These bootable files may be used as an emergency start up tool and may be BIOS configured. The RPA executor may be configured to execute repair scripts received from remote emulator 105. The processor may use tinyML, Edge AI and Tensor Lite for processing the computer health data to detect a system failure or a potential system failure. The secure client communication tool may be a secure communication channel for transmitting and receiving data to and from remote emulator 105.

Client agent 101 may be an application running on computing device 102. Client agent 101 may monitor the health of computing device 102. Client agent 101 may electronically communicate with EIEAC 103. Client agent 101 may transmit the computer health data and the configuration data to EIEAC 103 for analysis and for storing. The computer health data may be stored within the memory of EIEAC 103.

Computer health data gathered by client agent 101 may be transmitted to EIEAC 103 and stored within the memory. The computer health data may be periodically transferred to remote emulator 105 at pre-determined intervals. The computer health data may be periodically transferred to remote emulator 105 when failures may not have been identified. The computer health data may be transferred to remote emulator 105 when a system failure and/or a potential system failure has been identified.

When a failure is identified by the processor of EIEAC 103, the computer health data may be automatically transferred to remote emulator 105 without waiting for the pre-determined time period of the periodic transfer.

At the remote emulator 105, computer health data may be stored at data repository 107. Additional data, such as the file and/or historical data associated with EIEAC 103, may also be stored at data repository 107. Data stored at data repository 107 may be in XML/YAML format or any other suitable format.

Dataset 111 may represent some or all of the file. In some embodiments, when the computer health data identifies a system failure, the file may be transferred from data repository 107 to cloud ML 113. In some embodiments, the file may be transferred from EIEAC 103 directly to cloud ML 113. Cloud ML 113 may be trained to learn from existing failures and repair scripts executed to repair the failures.

Remote emulator 105 may feed historical data including an issue type and a repair script that fixed the issue type to cloud ML to train cloud ML to identify repair scripts for failures. Based on the training data, cloud ML may train an algorithm so that, when a system failure is identified, cloud ML can output one or more repair scripts that have a probability above a threshold value of fixing the system failure.

In some embodiments, when computer health data identifies a system failure, the data file may be transferred directly to cloud ML. Cloud ML may then use machine learning to output one or more repair scripts that have a probability above a threshold value of fixing the system failure.

Remote emulator 105 may generate digital triplets (1 . . . n) 119. Each digital triplet 119 may generate container 121 to test a repair script. Container 121 may run repair script 123 and output success score 125. Container 121 may be a sand box. All success scores 125 output by each of digital triplets (1 . . . n) 119 may be fed to remote emulator 105. Remote emulator 105 may use at least some of the repair scripts to create scripts bundle 129 which may then be sent to EIEAC 103 for running on computing device 101 via client agent 102.

Figure 2:
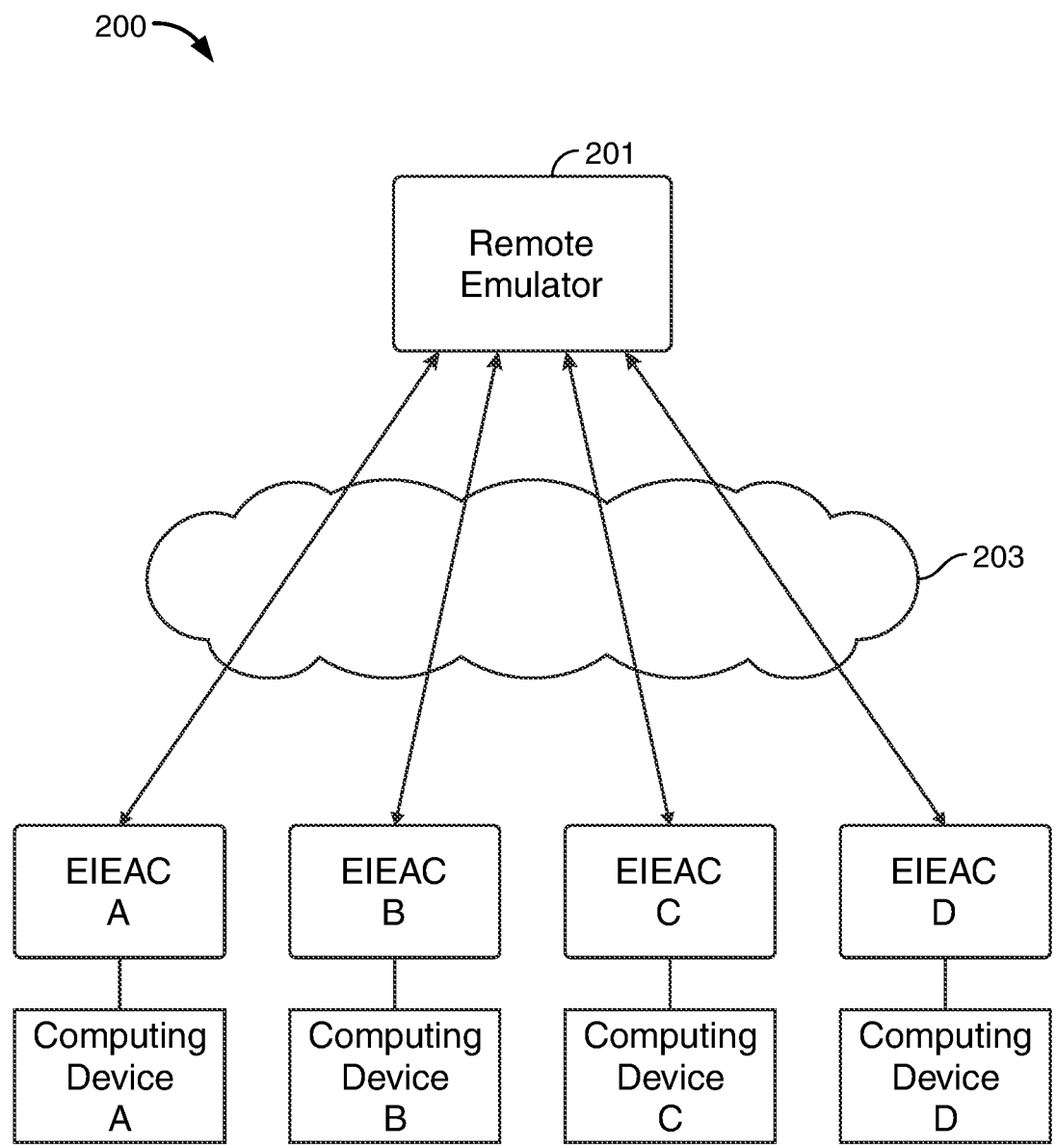
FIG. 2 shows an illustrative architecture diagram in accordance with principles of the disclosure.

FIG. 2 shows illustrative system architecture 200 in accordance with principles of the disclosure. System architecture 200 includes remote emulator 201 being in wireless communication, over internet 203, with EIEAC A, EIEAC B, EIEAC C and EIEAC D. Each of the EIEACs may be physically coupled with computing devices. Thus, remote emulator 201 may provide remote back-up services and technical support to each of computing device A, computing device B, computing device C and computing device D via communications with their associated EIEACs. Computing devices A-D may be part of a network of computing devices. One or more of computing devices A-D may be in communication with some or all of the other computing devices A-D.

Figure 3:
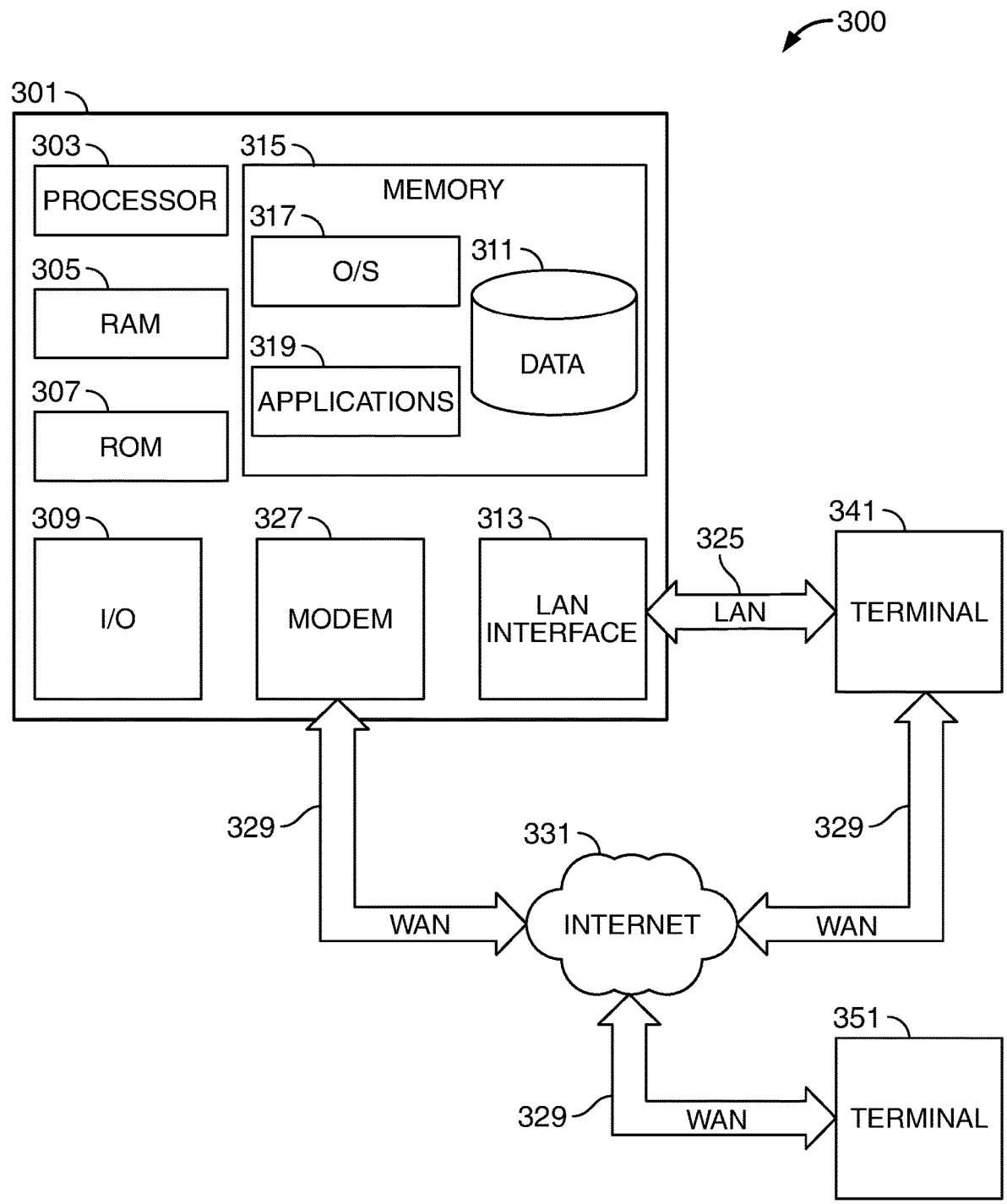
FIG. 3 shows an illustrative block diagram in accordance with principles of the disclosure.

FIG. 3 shows an illustrative block diagram of system 300 that includes computer 301. Computer 301 may alternatively be referred to herein as an "engine," "server" or a "computing device." The computing system may include one or more computer servers. Computer 301 may be any computing device described herein, such as the computing device coupled to the EIEAC, the EIEAC and/or the remote emulator. Elements of system 300, including computer 301, may be used to implement various aspects of the systems and methods disclosed herein.

Computer 301 may have a processor 303 for controlling the operation of the device and its associated components, and may include RAM 305, ROM 307, input/output circuit 309, and a non-transitory or non-volatile memory 315. Machine-readable memory may be configured to store information in machine-readable data structures. Other components commonly used for computers, such as EEPROM or Flash memory or any other suitable components, may also be part of the computer 301.

Memory 315 may be comprised of any suitable permanent storage technology—e.g., a hard drive. Memory 315 may store software including the operating system 317 and application(s) 319 along with any data 311 needed for the operation of computer 301. Memory 315 may also store videos, text, and/or audio assistance files. The data stored in Memory 315 may also be stored in cache memory, or any other suitable memory. Memory 315 may be memory within the EIEAC(s), computing device(s) and/or memory at the remote emulator.

Input/output ("I/O") module 309 may include connectivity to a microphone, keyboard, touch screen, mouse, and/or stylus through which input may be provided into computer 301. The input may include input relating to cursor movement. The input/output module may also include one or more speakers for providing audio output and a video display device for providing textual, audio, audiovisual, and/or graphical output. The input and output may be related to computer application functionality.

Computer 301 may be connected to other systems via a local area network (LAN) interface 313. Computer 301 may operate in a networked environment supporting connections to one or more remote computers, such as terminals 341 and 351. Terminals 341 and 351 may be personal computers or servers that include many or all of the elements described above relative to computer 301.

When used in a LAN networking environment, computer 301 is connected to LAN 325 through a LAN interface 313 or an adapter. When used in a WAN networking environment, computer 301 may include a modem 327 or other means for establishing communications over WAN 329, such as Internet 331.

In some embodiments, computer 301 may be connected to one or more other systems via a short-range communication network (not shown). In these embodiments, computer 301 may communicate with one or more other terminals 341 and 351, using a PAN such as Bluetooth®, NFC, ZigBee, or any other suitable personal area network.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or API. Web-based, for the purposes of this application, is to be understood to include a cloud-based system. The web-based server, such as the remote emulator, may transmit data to any other suitable computer system. The web-based server may also send computer-readable instructions, together with the data, to any suitable computer system or IoT device, such as the EIEAC. The computer-readable instructions may be to store the data in cache memory, the hard drive, secondary memory, or any other suitable memory.

Additionally, application program(s) 319, which may be used by computer 301, may include computer executable instructions for invoking functionality related to communication, such as e-mail, Short Message Service (SMS), and voice input and speech recognition applications. Application program(s) 319 (which may be alternatively referred to herein as "plugins," "applications," or "apps") may include computer executable instructions for invoking functionality related to performing various tasks. Application programs 319 may utilize one or more algorithms that process received executable instructions, perform power management routines or other suitable tasks. Application programs 319 may include any one or more of the applications, instructions and algorithms associated with the EIEAC performing monitoring and remedial action, the remote emulator processing received data, creating digital triplets and outputting bundled remedial scripts and any other methods performed by the EIEAC and the remote emulator as described herein.

Application program(s) 319 may include computer executable instructions (alternatively referred to as "programs"). The computer executable instructions may be embodied in hardware or firmware (not shown). Computer 301 may execute the instructions embodied by the application program(s) 319 to perform various functions.

Application program(s) 319 may utilize the computer-executable instructions executed by a processor. Generally, programs include routines, programs, objects, components, data structures, etc. that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

One or more of applications 319 may include one or more algorithms that may be used to implement features of the disclosure.

The invention may be described in the context of computer-executable instructions, such as applications 319, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 301 and/or terminals 341 and 351 may also include various other components, such as a battery, speaker, and/or antennas (not shown). Components of computer system 301 may be linked by a system bus, wirelessly or by other suitable interconnections. Components of computer system 301 may be present on one or more circuit boards. In some embodiments, the components may be integrated into a single chip. The chip may be silicon-based.

Terminal 351 and/or terminal 341 may be portable devices such as a laptop, cell phone, Blackberry™, tablet, smartphone, or any other computing system for receiving, storing, transmitting and/or displaying relevant information. Terminal 351 and/or terminal 341 may be one or more user devices. In illustrative embodiments, computer 301 may represent the remote emulator, terminal 351 may represent a first EIEAC and terminal 341 may represent a second EIEAC. Terminals 351 and 341 may be identical to computer 301 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, and/or smart phones, multiprocessor systems, microprocessor-based systems, cloud-based systems, programmable consumer electronics, network PCs, minicomputers, mainframe computers, distributed computing environments that include any of the above systems or devices, and the like.

Figure 4:
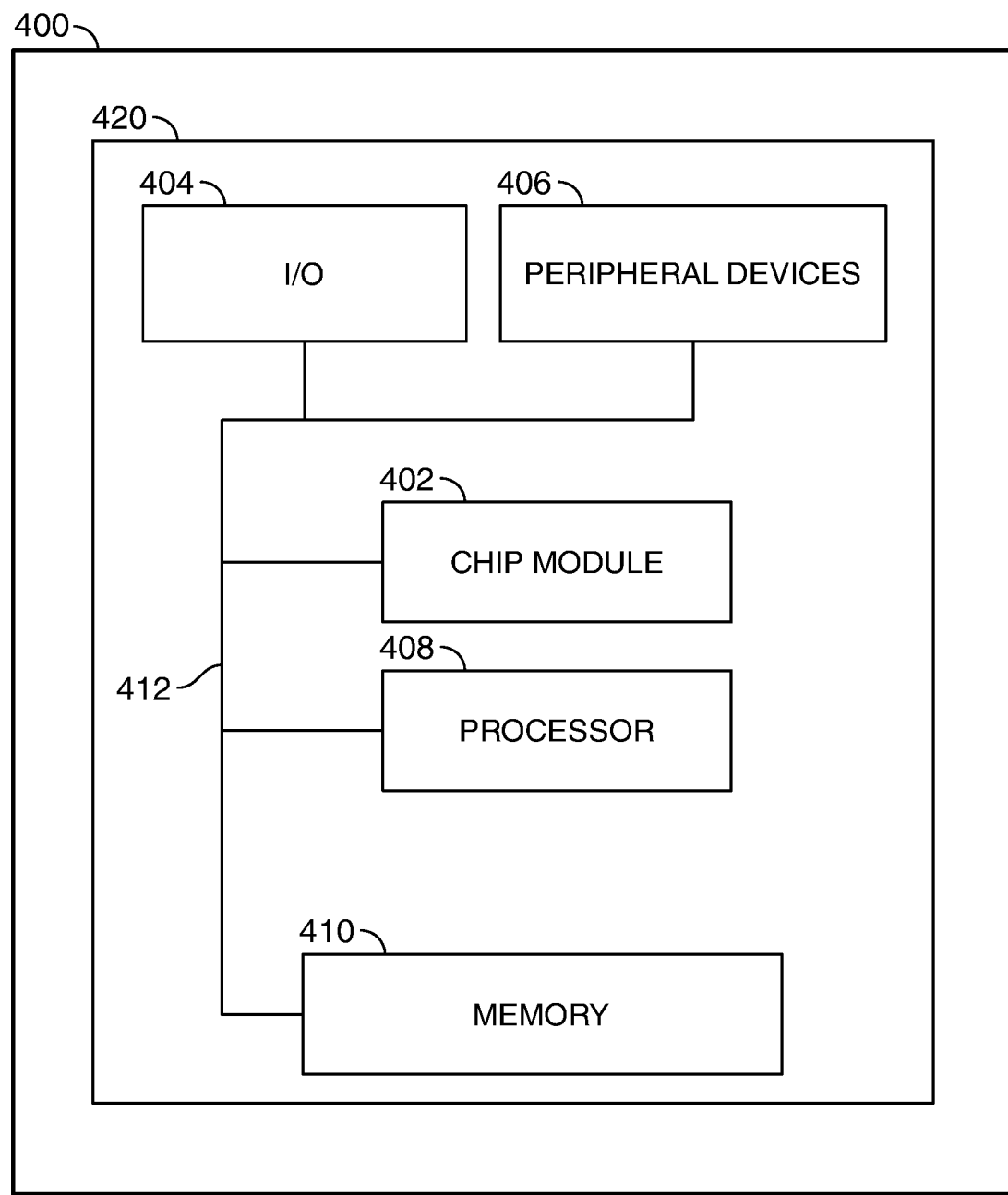
FIG. 4 shows an illustrative apparatus that may be configured in accordance with principles of the disclosure.

FIG. 4 shows illustrative apparatus 400 that may be configured in accordance with the principles of the disclosure. Apparatus 400 may be a computing device such as computer 301. Computer 301 may include some or all of the components of apparatus 400.

Apparatus 400 may include chip module 402, which may include one or more integrated circuits, and which may include logic configured to perform any other suitable logical operations.

Apparatus 400 may include one or more of the following components: I/O circuitry 404, which may include a transmitter device and a receiver device and may interface with fiber optic cable, coaxial cable, telephone lines, wireless devices, PHY layer hardware, a keypad/display control device or any other suitable media or devices; peripheral devices 406, which may include counter timers, real-time timers, power-on reset generators or any other suitable peripheral devices; logical processing device 408, which may compute data structural information and structural parameters of the data; and machine-readable memory 410.

Machine-readable memory 410 may be configured to store in machine-readable data structures: machine executable instructions, (which may be alternatively referred to herein as "computer instructions" or "computer code"), applications such as applications 119, signals, and/or any other suitable information or data structures.

Components 402, 404, 406, 408 and 410 may be coupled together by a system bus or other interconnections 412 and may be present on one or more circuit boards such as circuit board 420. In some embodiments, the components may be integrated into a single chip. The chip may be silicon-based.

Thus, systems and methods for using digital triplets to generate a bundle of optimal remediation scripts for healing a system failure are provided. Persons skilled in the art will appreciate that the present invention can be practiced by other than the described embodiments, which are presented for purposes of illustration rather than of limitation.

What is claimed is:

1. A system architecture for using digital triplets to generate a bundle of optimal remediation scripts for healing a system failure, the system architecture comprising: a stand-alone embedded internet of things ("IoT") edge artificial intelligence computing device ("EIEAC"), the EIEAC configured to operate independent of a computing device, the EIEAC, when physically coupled to the computing device, being configured to monitor and repair failures occurring at the computing device, the EIEAC comprising:
   a receiver configured to receive computer health data from a client agent application running on the computing device;
   a memory configured to store the computer health data;
   a battery configured to charge the EIEAC; and
   a processor configured to process the computer health data to identify one or more failures using tiny machine learning ("tinyML"), wherein, when a system failure is identified by the processor, the tinyML is configured to:
      send to a remote emulator a file including configuration details of the computing device at a time of the failure and at least some of the computer health data; and
      continuously transmit a stream of data to the remote emulator including a graphics processing unit ("GPU") temperature and a central processing unit ("CPU") temperature, the GPU and the CPU being included in the computing device;
   the remote emulator being configured to:
      feed the file to a machine learning algorithm and receive, from the machine learning algorithm, remedial scripts;
      create a plurality of digital triplets using the file and the stream of data, each of the digital triplets for testing one of the remedial scripts;
      run, in parallel, each of the remedial scripts on one of the digital triplets wherein, during the running, the digital triplets continuously receive the stream of data;
      after the running of the remedial scripts for a predetermined time period:
         terminate the digital triplets that have failed to output a success score; and
         collect from each of the remaining digital triplets a remedial script tagged with a success score, having been run by the digital triplet;
      bundle the remedial scripts tagged with a success score greater than a threshold value; and
      transmit the bundled remedial scripts to the EIEAC;
   the EIEAC being further configured to:
      in response to receipt of the bundled remedial scripts from the remote emulator:
         search, on the computing device, a historical log file listing a plurality of previously-executed remedial scripts and a success or failure associated with each of the previously-executed remedial scripts;
         delete, from the bundled remedial scripts, each remedial script that is identical to a previously-executed remedial script stored in the historical log file and associated with a failure;
         after the deleting, transmit to the computing device a first remedial script included in bundled remedial scripts, the first remedial script being tagged with a highest success score in the bundled remedial scripts; and
         in response to a determination that the first remedial script failed to remediate the system failure, transmit to the computing device a second remedial script tagged with a second-to-highest success score in the bundled remedial scripts.

2. The system architecture of claim 1 wherein the EIEAC is physically coupled to the computing device via one of a universal serial bus ("USB") port, serial port, parallel port, specialized network card, or Ethernet network.

3. The system architecture of claim 1 wherein the EIEAC is a 5G IoT device.

4. The system architecture of claim 1 wherein the computer health data comprises data associated with one or more of a registry backup, event logs, disorganized files, memory, heating of a central processing unit and a graphical processing unit, operating system ("OS") functionality, basic input/output system settings and restore points.

5. The system architecture of claim 1 wherein the file is in XML or YAML format.

6. The system architecture of claim 1 wherein the at least some of the computer health data includes all computer health data stored on the EIEAC within a time frame immediately preceding the system failure.

7. The system architecture of claim 1 wherein each remedial script is a different proposed approach, by the machine learning algorithm, for healing the system failure.

8. The system architecture of claim 1 wherein at least some of the terminated digital triplets were still running after a lapse of the predetermined time period.

9. The system architecture of claim 1 wherein:
the threshold value is a dynamic threshold value selected by the remote emulator based on a total value of the success scores; and
the dynamic threshold value is selected by the remote emulator such that no more than a predetermined number of remedial scripts are to be included in the bundled scripts.

10. The system architecture of claim 1 when the file is a first file, the bundled remedial scripts are first bundled remedial scripts, and the system failure is a first system failure, the EIEAC is further configured to, based on the computer health data:
predict an onset of a second system failure;
transmit a second file to the remote emulator; and
in response to transmitting the second file, receive, from the remote emulator, a second bundled remedial scripts for preventing the second system failure.

11. A method for using digital triplets to generate a bundle of optimal remediation scripts for healing a system failure, the method comprising: a stand-alone embedded internet of things ("IoT") edge artificial intelligence computing device ("EIEAC"), physically coupled to the computing device, receiving computer health data from a client agent application running on the computing device; the EIEAC processing the computer health data to identify one or more failures using tiny machine learning ("tinyML");
in response to an identification of a failure by the EIEAC, the EIEAC configured to perform the method steps of:
sending to a remote emulator a file including configuration details of the computing device at a time of the failure and at least some of the computer health data; and
continuously transmitting a stream of data to the remote emulator including a graphics processing unit ("GPU") temperature and a central processing unit ("CPU") temperature, the GPU and the CPU being included in the computing device;
the remote emulator being configured to perform the method steps of:
feeding the file to a machine learning algorithm and receive, from the machine learning algorithm, remedial scripts;
creating a plurality of digital triplets using the file and the stream of data, each of the digital triplets for testing one of the remedial scripts;
running, in parallel, each of the remedial scripts on one of the digital triplets wherein, during the running, the digital triplets continuously receive the stream of data;
after the running of the remedial scripts for a predetermined time period:
terminating the running of the digital triplets that have failed to output a success score; and collecting from each of the remaining digital triplets a remedial script tagged with a success score, having been run by the digital triplet;
bundling remedial scripts tagged with a success score greater than a threshold value; and
transmitting the bundled remedial scripts to the EIEAC;
the EIEAC being further configured to, in response to receipt of the bundled scripts from the remote emulator, perform the method steps of:
searching, on the computing device, a historical log file listing a plurality of previously-executed remedial scripts and a success or failure associated with each of the previously-executed remedial scripts;
deleting, from the bundled scripts, each remedial script that is identical to a previously-executed remedial script stored in the historical log file and associated with a failure;
after the deleting, transmitting to the computing device a first remedial script included in bundled scripts, the first remedial script being tagged with a highest success score in the bundled scripts; and
in response to a determination that the first remedial script failed to remediate the system failure, transmitting to the computing device a second remedial script tagged with a second-to-highest success score in the bundled scripts.

12. The method of claim 11 wherein the computer health data comprises data associated with one or more of a registry backup, event logs, disorganized files, memory, heating of a central processing unit and a graphical processing unit, operating system functionality, basic input/output system settings and restore points.

13. The method of claim 11 wherein the file is in XML or YAML format.

14. The method of claim 11 wherein the at least some of the computer health data includes all computer health data generated within a time frame immediately preceding the system failure.

15. The method of claim 11 wherein:
the threshold value is a dynamic threshold value selected by the remote emulator based on a total value of the success scores; and
the dynamic threshold value is selected by the remote emulator such that no more than a predetermined number of remedial scripts are to be included in the bundled scripts.

16. The method of claim 11, when the file is a first file, the bundled remedial scripts are first bundled remedial scripts, and the system failure is a first system failure, the EIEAC is further configured to, based on the computer health data, perform the methods steps of:
predicting an onset of a second system failure;
transmitting a second file to the remote emulator; and
in response to transmitting the second file, receiving, from the remote emulator, a second bundled remedial scripts for preventing the second system failure.

17. A system architecture for using digital triplets to generate a bundle of optimal remediation scripts for healing a system failure, the system architecture comprising: a stand-alone embedded internet of things ("IoT") edge artificial intelligence computing device ("EIEAC"), the EIEAC configured to operate independent of a computing device, the EIEAC, when physically coupled to the computing device, being configured to monitor and repair failures occurring at the computing device, the EIEAC comprising:
a receiver configured to receive computer health data from a client agent application running on the computing device;
a memory configured to store the computer health data;
a battery configured to charge the EIEAC; and
a processor configured to process the computer health data to identify one or more failures using tiny machine learning ("tinyML"), wherein, when a system failure is identified by the processor, the tinyML is configured to:
send to a remote emulator a file, in XML or YAML format, including configuration details of the computing device at a time of the failure and all computer health data generated within a first predetermined time period prior to the system failure; and continuously transmit a stream of data to the remote emulator including a graphics processing unit ("GPU") temperature and a central processing unit ("CPU") temperature, the GPU and the CPU being included in the computing device;

the remote emulator being configured to:
  feed the file to a machine learning algorithm and receive, from the machine learning algorithm, remedial scripts;
  create a plurality of digital triplets using the file and the stream of data, each of the digital triplets for testing one of the remedial scripts;
  run, in parallel, each of the remedial scripts on one of the digital triplets wherein, during the running, the digital triplets continuously receive the stream of data;
  after the running of the remedial scripts for a second predetermined time period:
    terminate the running of the digital triplets that have failed to output a success score; and collect from each of the remaining digital triplets a remedial script tagged with a success score, having been run by the digital triplet;
  bundle the remedial scripts tagged with a success score greater than a threshold value; and
  transmit the bundled remedial scripts to the EIEAC;
the EIEAC being further configured to:
in response to receipt of the bundled scripts from the remote emulator:
  search, on the computing device, a historical log file listing a plurality of previously-executed remedial scripts and a success or failure associated with each of the previously-executed remedial scripts;
  delete, from the bundled scripts, each remedial script that is identical to a previously-executed remedial script stored in the historical log file and associated with a failure;
  after the deleting, transmit to the computing device a first remedial script included in bundled scripts, the first remedial script being tagged with a highest success score in the bundled scripts; and
  in response to a determination that the first remedial script failed to remediate the system failure, transmit to the computing device a second remedial script tagged with a second-to-highest success score in the bundled scripts.

18. The system architecture of claim 17 wherein the computer health data comprises data associated with one or more of a registry backup, event logs, disorganized files, memory, heating of a central processing unit and a graphical processing unit, operating system functionality, basic input/output system settings and restore points.

19. The system architecture of claim 17 wherein:
  the threshold value is a dynamic threshold value selected by the remote emulator based on a total value of the success scores; and
  the dynamic threshold value is selected by the remote emulator such that no more than a predetermined number of remedial scripts are to be included in the bundled scripts.

20. The system architecture of claim 17 when the file is a first file, the bundled remedial scripts are first bundled remedial scripts, and the system failure is a first system failure, the EIEAC is further configured to, based on the computer health data:
  predict an onset of a second system failure;
  transmit a second file to the remote emulator; and
  in response to transmitting the second file, receive, from the remote emulator, a second bundled remedial scripts for preventing the second system failure.

\* \* \* \* \*